(12) United States Patent
Fielding, Jr.

(10) Patent No.: US 7,699,463 B2
(45) Date of Patent: *Apr. 20, 2010

(54) EYEWEAR WITH ADJUSTABLE RETENTION STRAP

(76) Inventor: Jerry Fielding, Jr., 11325 Guyn Dr., Brighton, MI (US) 48114

( * ) Notice: Subject to any disclaimer, the term of this patent is extended or adjusted under 35 U.S.C. 154(b) by 0 days.

This patent is subject to a terminal disclaimer.

(21) Appl. No.: 12/356,260

(22) Filed: Jan. 20, 2009

(65) Prior Publication Data

US 2009/0122258 A1    May 14, 2009

Related U.S. Application Data

(63) Continuation of application No. 12/110,810, filed on Apr. 28, 2008, now Pat. No. 7,478,906.

(51) Int. Cl.
*G02C 3/00* (2006.01)
(52) U.S. Cl. .......................................... 351/156; 2/452
(58) Field of Classification Search ................ 351/156, 351/116, 111, 140, 158, 41; 2/452, 426, 2/12, 13, 15; D16/311; 24/3.3
See application file for complete search history.

(56) References Cited

U.S. PATENT DOCUMENTS

| | | | |
|---|---|---|---|
| 3,378,851 A | 4/1968 | McBrayer | |
| 4,930,885 A | 6/1990 | Laschober | |
| 5,046,200 A | 9/1991 | Feder | |
| 5,268,710 A * | 12/1993 | Anstey | 351/121 |
| 5,818,569 A | 10/1998 | Berent | |
| D466,543 S | 12/2002 | Beames | |
| 7,322,692 B2 | 1/2008 | Winningham | |
| 7,478,906 B2 | 1/2009 | Fielding, Jr. | |

OTHER PUBLICATIONS

International Search Report for International Application No. PCT/US06/42231, dated Jun. 20, 2007; 1 Page.

* cited by examiner

*Primary Examiner*—Hung X Dang
(74) *Attorney, Agent, or Firm*—Harness, Dickey & Pierce, P.L.C.

(57) ABSTRACT

Eyewear includes a frame having a first side and a second side. The eyewear additionally includes a continuous strap. The continuous strap includes a first end and a second end. The first end is secured to the first side of the frame. The continuous strap includes a first side and a second side. The second side has a first portion and a second portion. The first portion includes one of a hook material and a loop material. The second portion includes the other of the hook material and loop material. The continuous strap passes through the opening proximate the second side of the frame and doubles over such that the hook material cooperatively engages the loop material.

15 Claims, 10 Drawing Sheets

EYEWEAR WITH ADJUSTABLE RETENTION STRAP

CROSS-REFERENCE TO RELATED APPLICATIONS

This application is a continuation of U.S. Continuation-in-Part application Ser. No. 12/110,810 filed 28 Apr. 2008, now U.S. Pat. No. 7,478,906 which claims the benefit of International POT Application No. PCT/US2006/042231, filed Oct. 27, 2006, which claims the benefit of U.S. Provisional Application No. 60/731,523, filed Oct. 28, 2005. The disclosures of the above applications are incorporated herein by reference.

INTRODUCTION

The present teachings relate generally to eyewear. More particularly, the present teachings relate to eyewear with an adjustable retention strap. The present teachings also more particularly relate to a method of providing a custom fit retention strap for eyewear.

Various different types of eyewear are known for improving vision, protecting the eyes (e.g., from the sun or from injury), and/or both. Traditionally, eyewear has included a pair of arms that cooperate with a user's ears for purposes of retention. Many types of known eyewear alternatively include one or more straps for retention. Such straps are common for sports glasses and ski and swim goggles, for example.

The primary intended purposes of eyewear are vision enhancement and eye protection. In addition to these primary intended purposes, eyewear should be both comfortable to wear and adjustable to fit various users. Additionally, eyewear should be easily secured to the user.

While known eyewear has generally proven to be suitable for enhancing vision and eye protection, all known designs are associated with disadvantages and/or limitations with respect to wearability and adjustability. Accordingly, it remains a need in the pertinent art to provide an adjustable strap arrangement for eyewear which overcomes the disadvantages and limitations associated with the known prior art.

SUMMARY

According to one aspect, the present teachings provide eyewear including a frame and a strap. The frame includes a first side and a second side. The strap includes a first end and a second end. The first end is secured to the first side of the frame. The strap further includes a first side and a second side. The second side has a first portion and a second portion. The first portion includes one of a hook material and a loop material. The second portion includes the other of the hook material and loop material. The strap passes through an opening proximate the second side of the frame and doubles over itself such that the hook material cooperatively engages the loop material.

According to another aspect, the present invention provides eyewear including a frame and an adjustable strap. The frame includes a first side and a second side. The adjustable strap includes a first end and a second end. A clip releasably secures the adjustable strap to the first side of the frame. The adjustable strap further including a first side and a second side. The second side has a first portion and a second portion. The first portion includes one of a hook material and a loop material. The second portion includes the other of the hook material and loop material. The strap passes through an opening proximate the second side of the frame and doubles over itself such that the hook material cooperatively engages the loop material.

According to yet another aspect, the present teachings provide eyewear comprising a frame including a first side and a second side, a strap including a first end and a second end, a retention mechanism carried proximate the first side of the frame and a securing the adjustable strap to the first side of the frame. The strap further including a first side and a second side, the second side having a first portion and a second portion, the first portion including one of a hook material and a loop material, the second portion including the other of the hook material and loop material, the strap passing through an opening proximate the second side of the frame and double over for a substantial portion of a length between the first and second sides such that the hook material cooperatively engages the loop material.

According to still yet another aspect, the present teachings provide a method of adjustably retaining an eyewear frame to a user. The method includes providing an adjustable strap including a first end and a second end. The adjustable strap additionally includes a first portion and a second portion. The adjustable strap further includes a first side and a second side. The method additionally includes cutting the adjustable strap to a desired length by trimming the first end and passing the second end through an opening proximate a first side of the frame. The method further includes pulling a substantial portion of the adjustable strap through the opening adjacent the first side of the frame and preventing the first end from passing through the opening proximate the first side of the frame. The method still further includes passing the second end through an opening proximate the second side of the frame and coupling the hook material with the loop material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2a is an enlarged view of the detail of Circle 2a of FIG. 2.

FIG. 2b is an enlarged view of the detail of Circle 2b of FIG. 2.

FIG. 7 is a cross-sectional view taken along the line 7-7 of FIG. 1.

DISCUSSIONS OF VARIOUS ASPECTS

Figure 1:
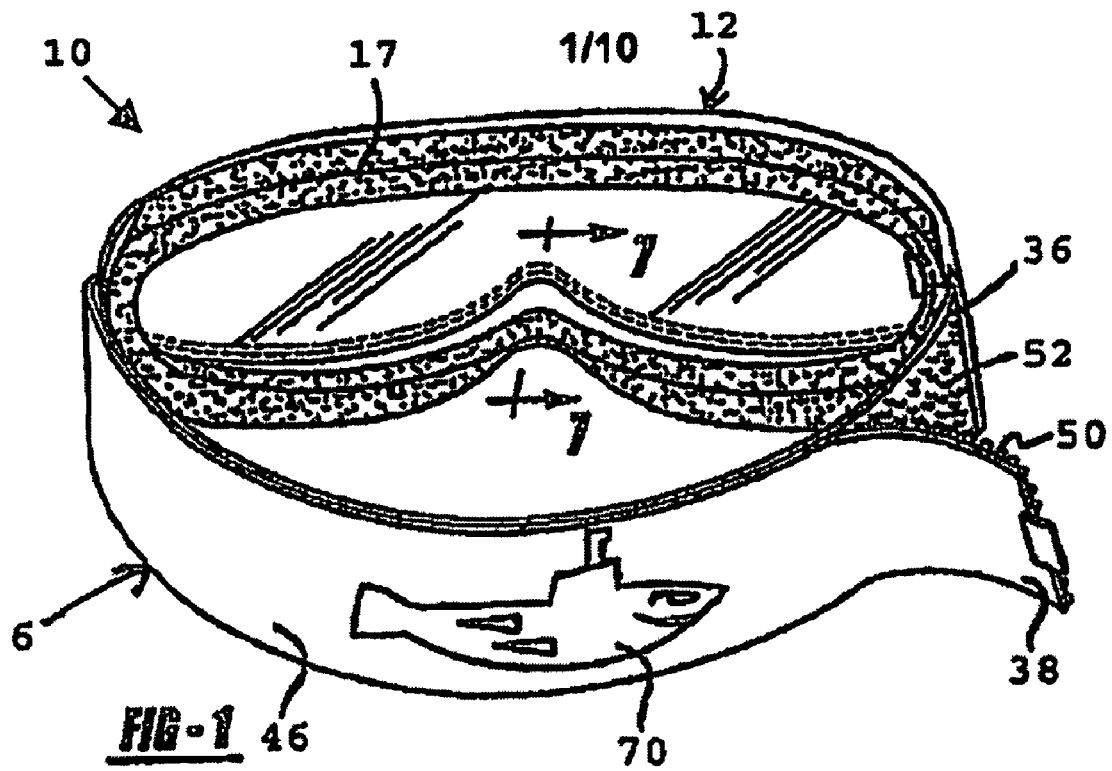
FIG. 1 is a rear perspective view of eyewear incorporating an adjustable strap in accordance with the present teachings.

The following description of the embodiment(s) is merely exemplary in nature and is in no way intended to limit the invention, its application, or uses.

With initial reference to the FIGS. 1 through 7 of the drawings, a first form of eyewear constructed in accordance with the teachings of the present invention is illustrated and generally identified at reference 10. In the particular embodiment illustrated, the eyewear is specifically intended to protect a user's eyes during activities such as snow skiing and the like. In this regard, the eyewear is illustrated in the form of ski goggles. It will be appreciated by those skilled in the art, however, that the present teachings are not so limited. It is anticipated that various teachings of the present invention have application to other types of eyewear, including prescription and non-prescription eyewear.

The eyewear 10 is shown to generally include a frame 12, a lens 14 and an adjustable strap 16. A foam member 17 surrounds the lens 14 and is intended to be disposed between the frame 12 and the head of the user. It will be understood that the frame 12 and the foam member 17 are conventional in construction insofar as these components are not otherwise described herein. In this regard, one focus of the present teachings is directed to the adjustable strap 16 and the manner that the adjustable strap cooperates with the frame 12. A conventionally designed frame 12 may be adapted in the manner discussed below within the scope of the present teachings.

The eyewear frame 12 is illustrated to generally include a first or right side 18 and a second or left side 20. The first side 18 is particularly shown in the enlarged view of FIG. 2b. The second side 20 is particularly shown in the enlarged view of FIG. 2a. Reference to a left side and a right side is only made herein for ease of description. The cooperative relationship between the strap 16 and the first or right side 18 of the frame will be understood to be interchangeable with the cooperative relationship between the strap 16 and the second or left side 20 of the frame.

The first and second ends 18 and 20 of the frame 12 are associated with strap retention means. The strap retention means may comprise an opening 22 (see FIG. 2a, for example) passing through the frame 12. The frame 12 may be formed of plastic or other suitable material and the opening 22 may be integrally formed with the frame 12.

The adjustable strap 16 is generally shown to include a first end 36 and a second end 38. The adjustable strap 16 is additionally shown to generally include a first portion 40 adjacent the first end 36 and a second portion 42 adjacent the second end 38. The first and second portions 40 and 42 may be connected by an intermediate portion 44. The adjustable strap 16 is further shown to generally include a first side 46 and a second side 48.

The adjustable strap 16 may be provided with cooperating portions of hook and loop type fastening materials 50 and 52. The adjustable strap 16 may include an elastic band 54. The hook and loop type fastening materials 50 and 52 may be sewn or otherwise suitably secured to the elastic band 50. Suitable hook and loop type fastening materials 50 and 52 are commercially available under the trademark Velcro®.

Figure 2:
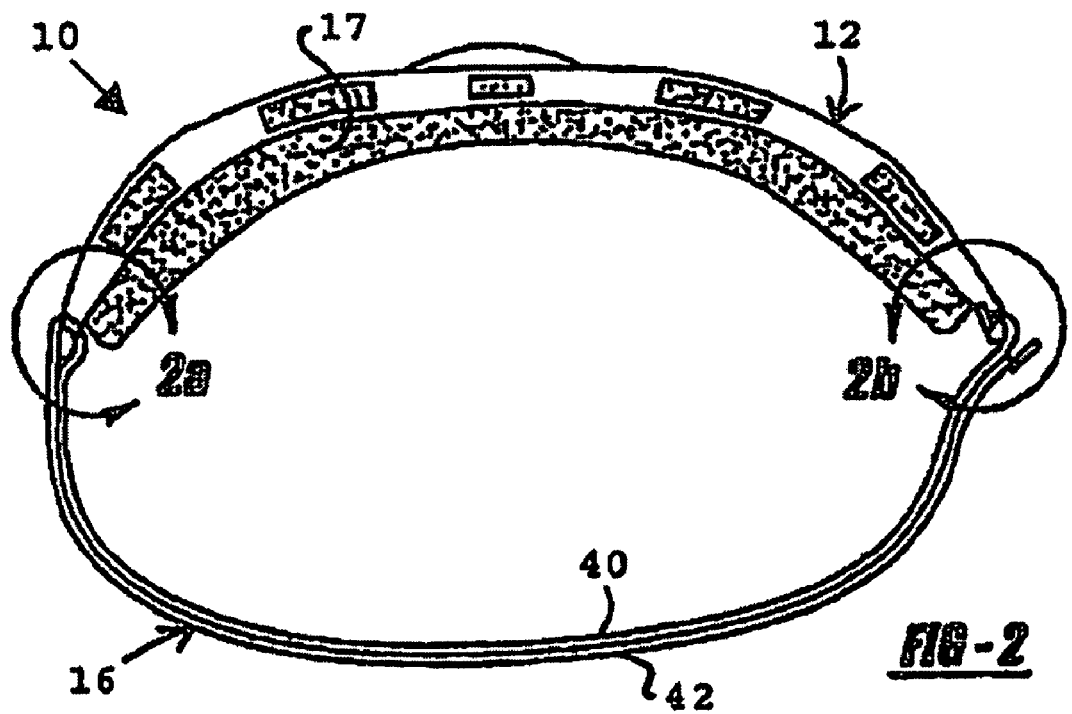
FIG. 2 is a top view of eyewear incorporating an adjustable strap in accordance with the present teachings.

As shown in the top view of FIG. 2 and as will be described further herein, when the adjustable strap 16 is secured to the frame 12 of the eyewear 10, the first portion 40 at least partially overlaps the second portion 42. The second side 48 of the first portion 40 may be provided with one of the hook and loop materials 50 and 52. The second side 48 of the second portion 42 may be provided with the other of the hook and loop materials 50 and 52. In one application, the second side 48 of the first portion 40 may be provided with the hook material 50. In this application, the second side 48 of the second portion 42 may be provided with the loop material 52 and the second side 48 of the first portion 40 may be provided with the cooperating hook material 50.

Figure 3:
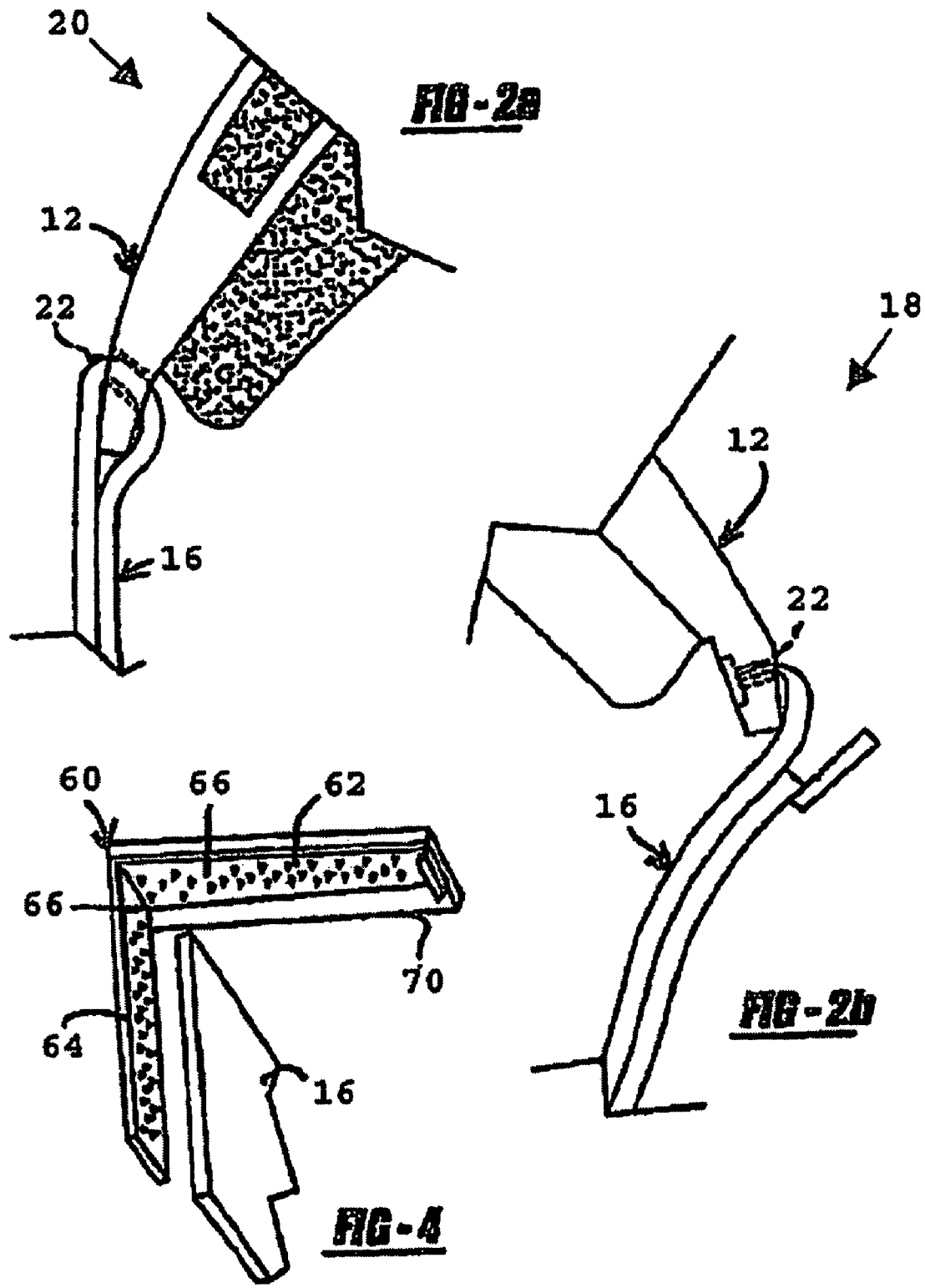
FIG. 3 is a rear view of the adjustable strap of the eyewear of FIG. 1, the adjustable strap shown removed from the remainder of the eyewear for purposes of illustration.
Figure 4:
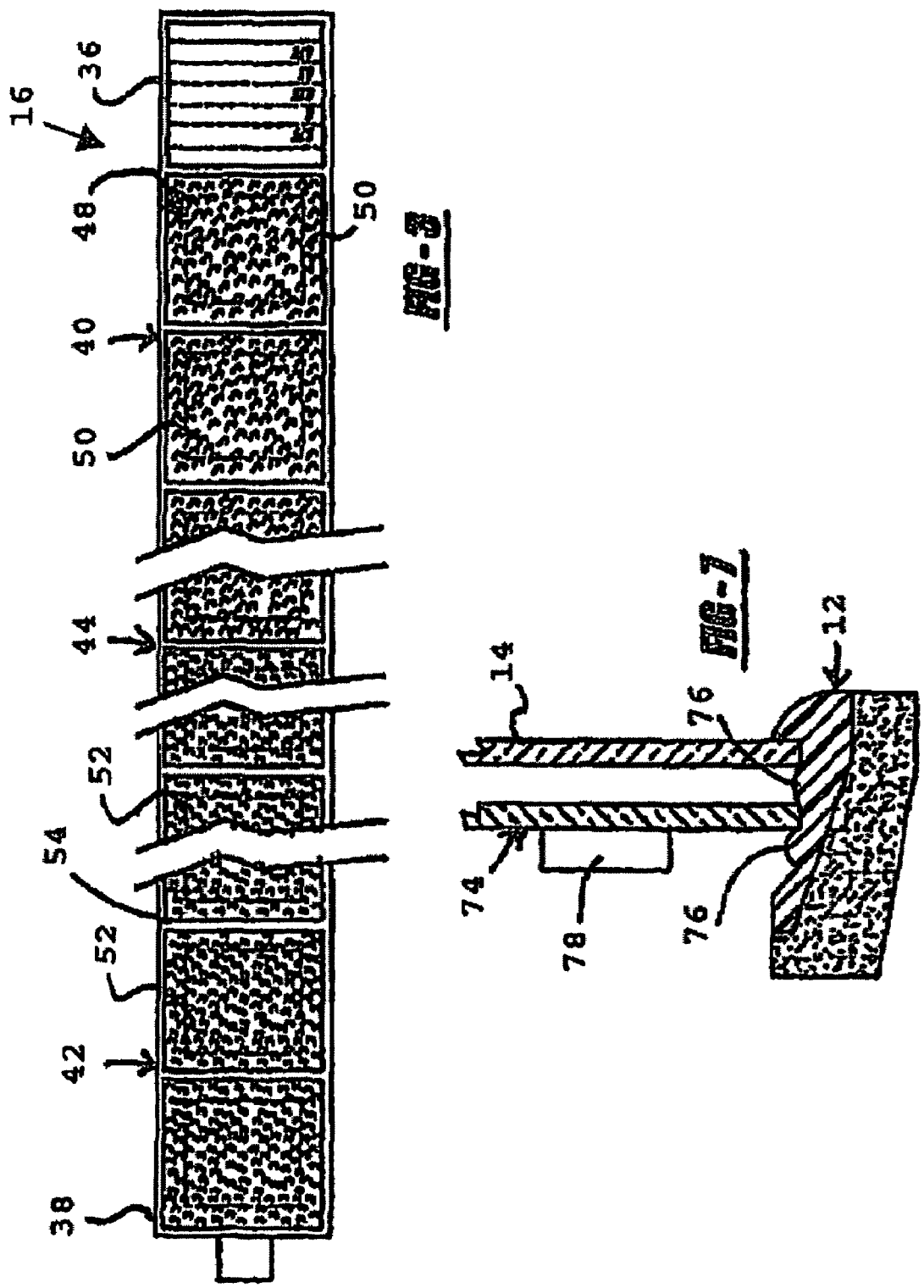
FIG. 4 is a partially exploded perspective view illustrating a clip in accordance with the present teachings shown associated with the adjustable strap.
Figure 5:
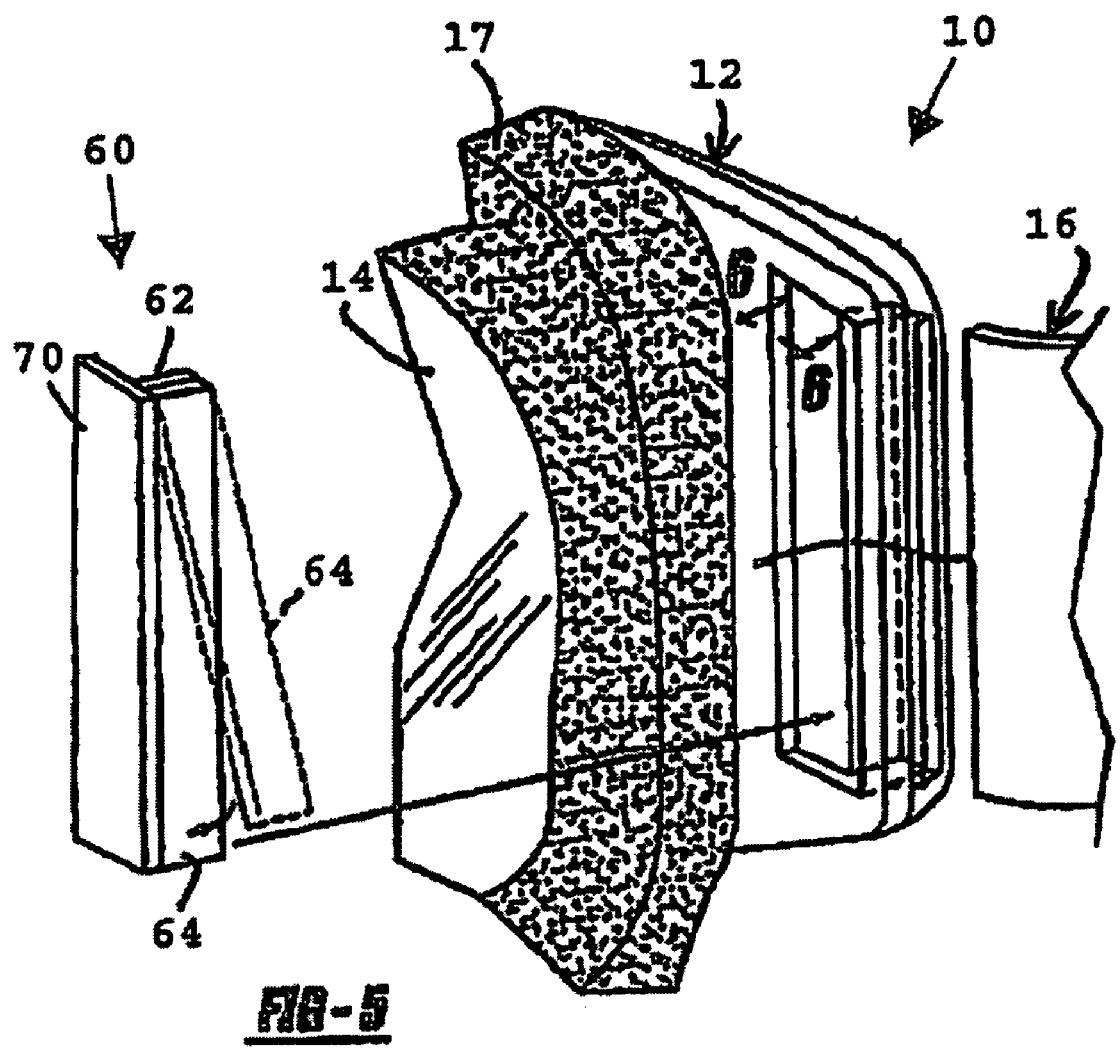
FIG. 5 is an exploded perspective view of a portion of the eyewear of FIGS. 1 and 2.
Figure 6:
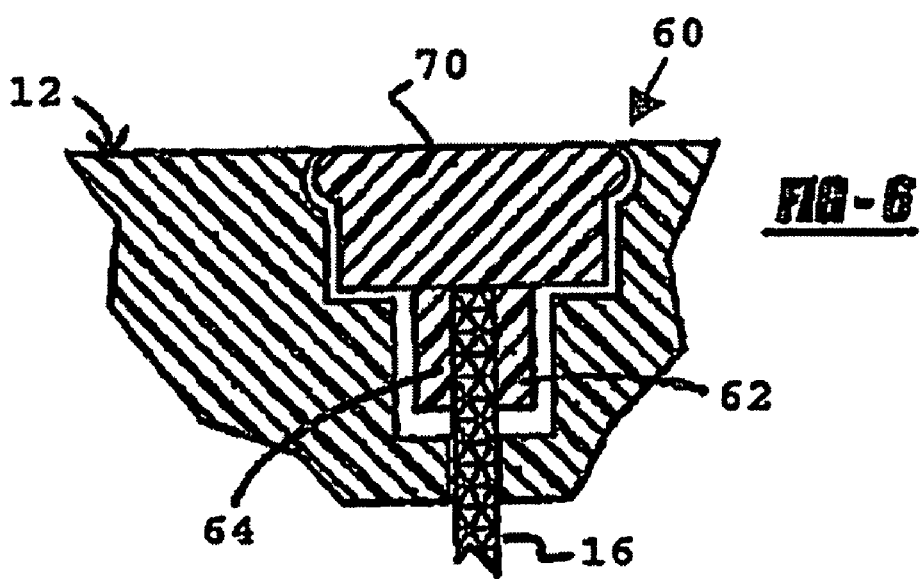
FIG. 6 is a cross-sectional view taken along the line 6-6 of FIG. 5.

The hook and loop materials 50 and 52 may be provided in a plurality of distinct sections 56. As shown in FIG. 3, the hook and loop materials 50 and 52 may be provided in sections independently sewn or otherwise suitably attached to the elastic band 54. The hook and loop materials 50 and 52 may be generally square, rectangular or any other shape. Adjacent hook and loop materials 50 and 52 may be slightly spaced apart so as to retain the elasticity of the elastic band 54.

The strap 16 may provide a custom fit for the user. Prior to a first use, the second end 38 may be drawn through the opening 22 defined proximate the first end 18 of the frame 12. A sufficient length of the adjustable strap 16 may be drawn through the opening 22 such that the adjustable strap 16 can be doubled over itself in the matter shown best in FIG. 2. The length of the strap 16 should be such to securely and comfortably fasten the eyewear 10 to the user. After the appropriate length has been selected, the first end 36 of the adjustable strap 16 can be trimmed to remove any excess.

As shown in FIG. 3, the first end 36 may be provided with indicia (see FIG. 3) indicative of a desired length of the strap 16. For example, the first end 36 may be provided with indicia corresponding with various head circumferences. In this manner, the user may simply cut the first end 36 along a line corresponding to his or her head circumference to insure a proper fit of the eyewear 10.

After the adjustable strap 16 is trimmed to the appropriate length, the first end 36 may be provided with retention means. The retention means may be any structure which prevents the first end 36 from passing through the opening proximate the first end 18 of the frame 12. The retention means may be a clip (or clip member) or a clamp secured to the first end 36. In certain applications, the retention means may simply be an enlarged end of the adjustable strap 16. Alternatively, the retention means may be carried by the frame 12. Again alternatively, the strap 16 may be provided with slightly enlarged portions (e.g., extending transverse to the length of the strap 16). The enlarged portions (not shown) may be sized such that they can be drawn through the opening 22 in the first end 18 of the frame 12 with sufficient force, but will otherwise serve to anchor the strap 16 relative to the first end 18 of the frame 12.

One suitable clip is illustrated in the drawings at reference character 60. The clip 60 may include first and second cooperating jaws 62 and 64. The cooperating jaws 62 and 64 may be hinged to one another for relative movement about an axis. The jaws 62 and 64 of the clip 60 may be provided with spikes or teeth 66 to improve gripping of the strap 16. As shown most particularly in FIG. 4, the spikes 66 may be provided on both inner surfaces of the jaws 62 and 64. Alternatively, one of the jaws 62 or 64 may be provided with one or more male structures (including but not limited to the illustrated spikes 66) and the other of the jaws 62 or 64 may be provided with cooperating female structure (including but not limited to holes for receiving the spikes 66).

One of the jaws 62 or 64 may carry a base portion 70. The opening 22 in the first side 18 of the frame 12 may be configured to substantially receive the clip 60 (including the base portion 70) in a mating relationship. As perhaps best shown in the cross-sectional view of FIG. 6, the base portion 70 may be rounded or otherwise suitably formed so as to be snap fit within the opening 22 of the first side 18 of the frame 12. In this manner, the first end 36 of the adjustable strap 16 may be recessed within and securely attached to the frame 12. The described attachment provides a clean appearance.

With the adjustable strap 16 substantially pulled through the opening 22 proximate the first end 18 of the frame 12, the second end 38 is drawn through the opening 22 proximate the second end 20 of the frame 12. The strap 16 is doubled over on itself as shown in FIG. 2. The hook and loop materials 50 and 52 cooperatively engage one another for maintaining the adjustable strap 16 in a desired position.

The adjustable strap 16 of the present invention provides an arrangement that is both secure and comfortable. The adjustable strap 16 additionally provides an arrangement that may be easily secured to the user. In this regard, a small child may easily secure the eyewear 10 in the manner discussed above without the assistance of an adult. Furthermore, the adjustable strap 16 allows the user to position and remove the eyewear 10 without the need to remove headwear such as a hat. In this regard, since one end of the adjustable strap 16 is free, the strap 16 need not be stretch to accommodate entry of the head (and hat).

The adjustable strap 16 of the present invention further provides a desirable surface which may carry corporate logos or other graphics 70 (see FIG. 1). The corporate logos or other graphics 70 may be positioned at the rear of the user's head where visibility to others will be maximized. The logos or other graphics 70 may be affixed to the first side 46 of the strap 16 (i.e., the side opposite the hook and loop materials 50 and 52). The corporate logos or other graphics 70 may include advertising (e.g., where the eyewear is given away as a promotion), or other indicia that may be popular with the intended wearer so as to thereby influence purchasing decisions.

The eyewear 10 may be provided with one or more lens inserts 74. As particularly shown in the cross-sectional view of FIG. 7, the frame 12 may be adapted to interchangeably receiving a lens insert 74. The lens insert 74 may be shaped similarly to the lens 14 and be positioned in the frame 12 adjacent to the lens 14. The lens insert 74 may provide filtering for particular conditions (e.g., bright sun) or simply allow the user to customize the eyewear 10 through the introduction of an alternate lens color. The lens insert 74 is intended to be used in tandem with the lens 14. In this regard, the lens insert 74 may be positioned inwardly relative to the lens 14 and may be oriented substantially parallel to the lens 14. The lens insert 74 may be disposed adjacent to the lens 14 or spaced from the lens 14.

The frame 12 may be provided with a retention feature 76. The retention feature 76 may be one or more raised portion. The one or more raised portions 76 may be integrally formed with the frame 12 or added to the frame as discrete elements. The raised portions 76 may substantially extend around an inner perimeter of the frame 12 or may be located at various positions about the perimeter suitable for removably retaining the lens insert 74 within the frame 12. The resiliency of the plastic frame 12 may allow the lens insert 74 to be inserted and removed in a snap-fit type relationship. The lens insert 74 may be provided with a tab 78 to facilitate removal from the frame 12.

Figure 8:
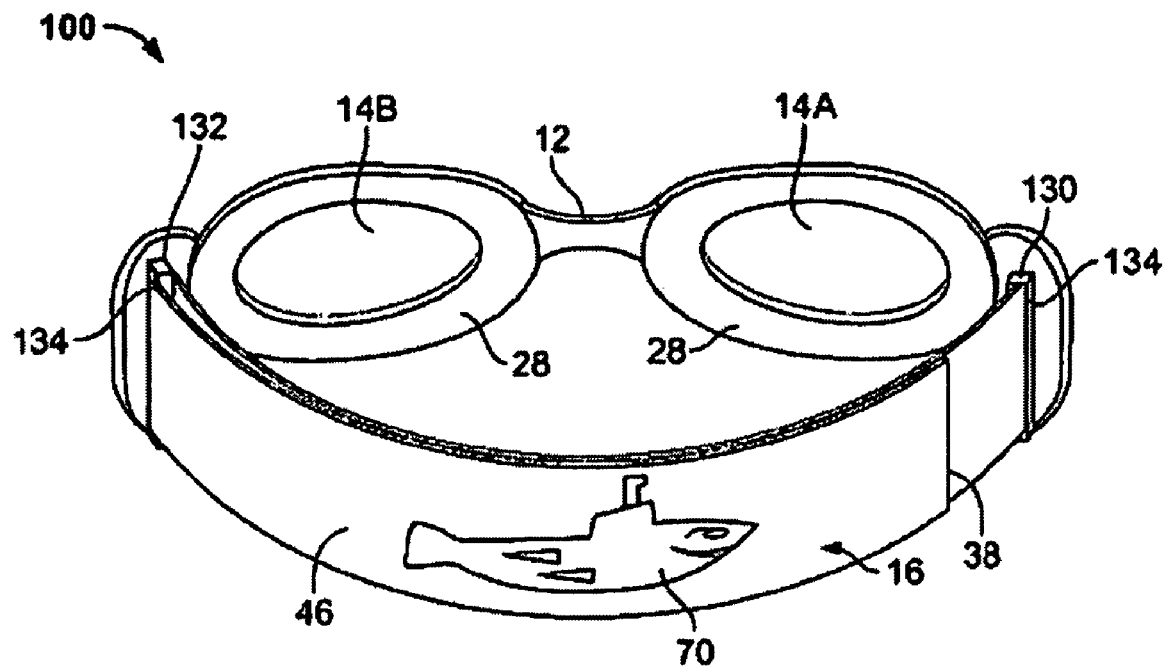
FIG. 8 is a rear perspective view of another form of eyewear incorporating an adjustable strap in accordance with the present teachings.
Figure 9:
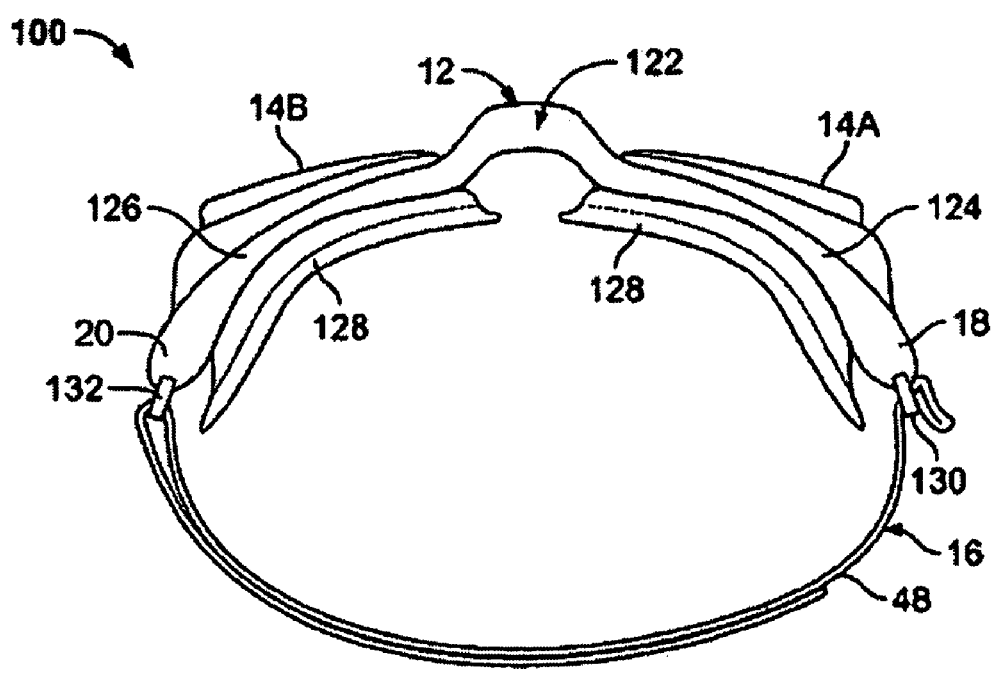
FIG. 9 is a top view of the eyewear of FIG. 8.
Figure 10:
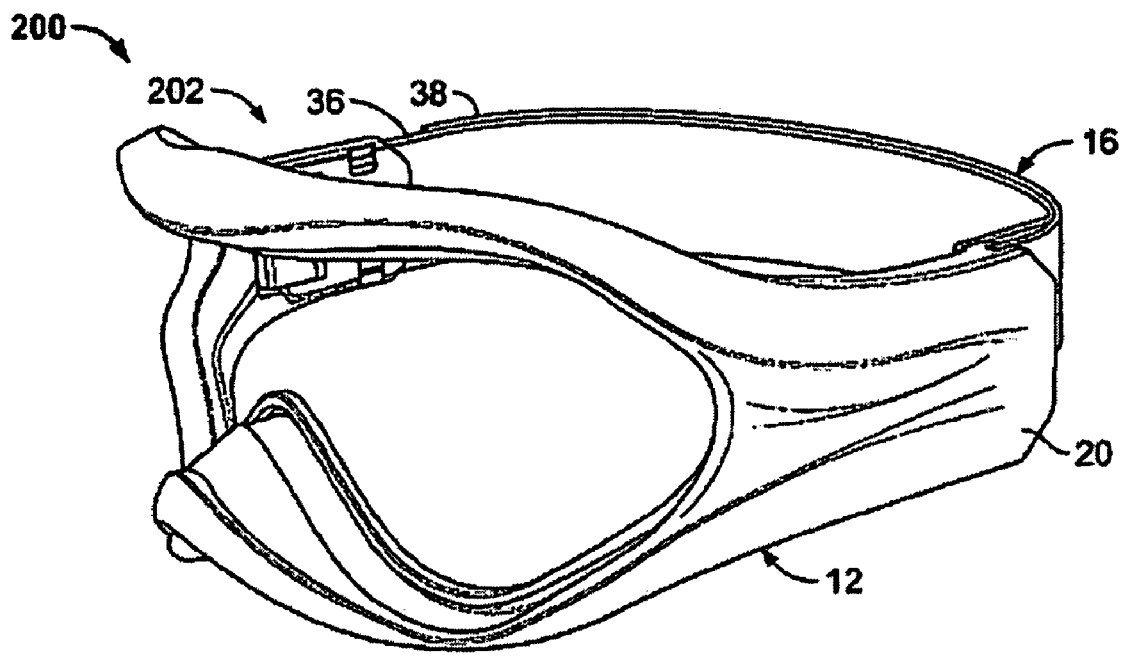
FIG. 10 is a perspective view of another form of eyewear incorporating an adjustable strap in accordance with the present teachings.
Figure 11:
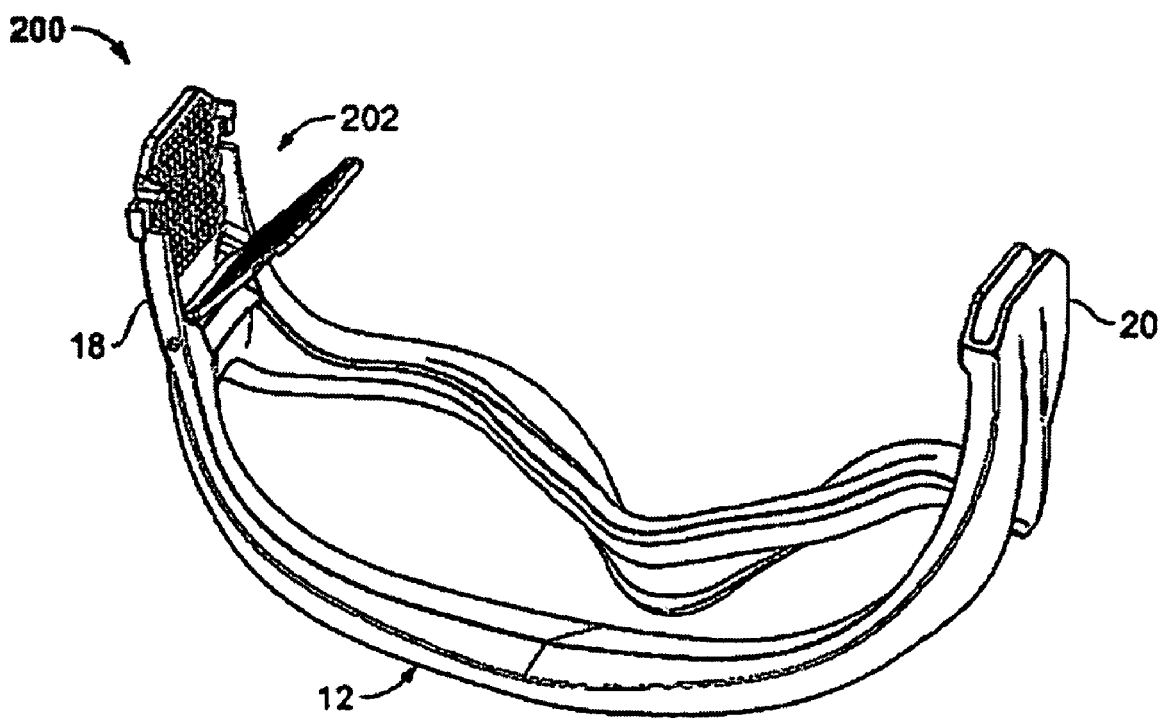
FIG. 11 is another perspective view of the eyewear of FIG. 10.

Turning to FIGS. 8 and 9, a second form of eyewear in accordance with the present teachings is illustrated and generally identified at reference character 100. In view of the similarities between the eyewear 10 and the eyewear 100, like reference characters are used between the respective drawings to indicate similar elements. The eyewear 100 differs from the eyewear 10 in that it is embodied as a swim goggle. It will again be appreciated that the present teachings may be alternatively incorporated into virtually any type of eyewear, including prescription eyewear and non-prescription eyewear.

The eyewear 100 is shown to generally include a frame 12, a pair of lenses 14A and 14B and an adjustable strap 16. The eyewear frame 12 may incorporate a central bridge portion 122. A first oval shaped portion or lens retaining portion 124 may be defined between the first end 18 and the bridge portion 122 and may receive a first lens 14A. A second oval shaped portion or lens retaining portion 126 may be defined between the second end 20 and the bridge portion 122 and may receive a second lens 14B. The first and second oval shaped portions 124 and 126 are both associated with eye seals 128. The eye seals 128 may rearwardly extend from the frame 12 and form waterproof seals between the face of the user and the frame 12.

The first and second ends 18 and 20 are associated with strap retention means. The strap retention means may comprise a first clip or ring 130 positioned proximate the first end 18 and a second clip 132 positioned proximate the second end 20. As will be further discussed below, the first and second clips or rings 130 and 132 may define openings 134 for receiving the adjustable strap 16. As with the early described frame 12, the strap retention means may alternatively include holes or apertures integrally defined by the frame 12 proximate the ends 18 and 20.

Turning to FIGS. 10 through 15B, another form of eyewear in accordance with the present teachings is illustrated and generally identified at reference character 200. In view of the similarities between the eyewear 200 and the previously described eyewear, like reference characters are again used between the respective drawings to indicate similar elements. In accordance with one aspect, the eyewear 200 differs from the previously described embodiments through the incorporation of an alternative arrangement for retaining an end of an adjustable strap 16.

The eyewear 200 may generally include a frame 12 having a first arm, side, or end 18 and a second arm, side, or end 20. The first arm 18 is shown particular in FIGS. 13 through 15B. The second arm 20 is shown particularly in FIGS. 12A and 12B. As will be addressed herein, the first arm 18 may function to retain a first end 36 (see FIG. 10) of the adjustable strap 16.

Figure 13:
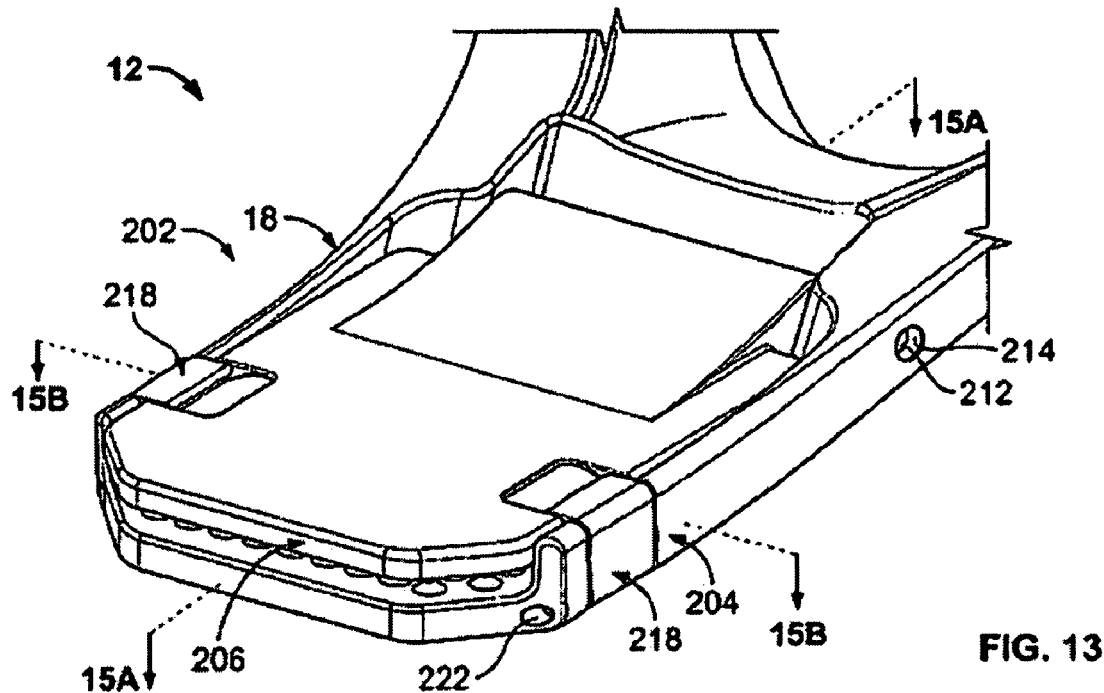
FIG. 13 is a perspective view of a first arm of the eyewear of FIG. 10, a strap retention mechanism shown in a closed position.

The first arm 18 may be associated with a strap retention mechanism 202. The strap retention mechanism 202 is shown in FIG. 13 in an open position and shown in FIG. 14 in a closed position. The strap retention mechanism 202 may generally include first and second jaws 204 and 206 between which the first end 36 of the strap 16 is captured. As illustrated, the first jaw 204 may be a fixed jaw and the second jaw 206 may be a moveable jaw.

The first arm 18 of the frame 12 may integrally define the first jaw 204. As illustrated, the first jaw 204 may include a generally planar central portion 208 and a pair of upwardly extending sides 210. The central portion 208 and the sides 210 may cooperate to define a recess for receiving the second jaw 206. The second jaw 206 may be hinged to the first arm 18 for relative movement about a jaw axis. The axis may be defined by a pin 212 disposed in opposing openings 212 of the first arm 18 and extending through the second jaw 206. In this manner, the second jaw 206 is pivotable between open (see FIG. 13) and closed positions (see FIG. 14).

The jaws 204 and 206 of the strap retention mechanism 202 may be provided with spikes or teeth 214 to improve gripping of the strap 16. As illustrated, the spikes or teeth 214 may be provided on one of the jaws 204 or 206 and the other of the jaws 204 or 206 may include recesses for 216 receiving the teeth 214. Alternatively, both of the jaws 204 and 206 may include teeth 214. As particularly illustrated, the first jaw 204 includes the teeth 214 and the second jaw 216 includes the cooperating recesses.

Figure 14:
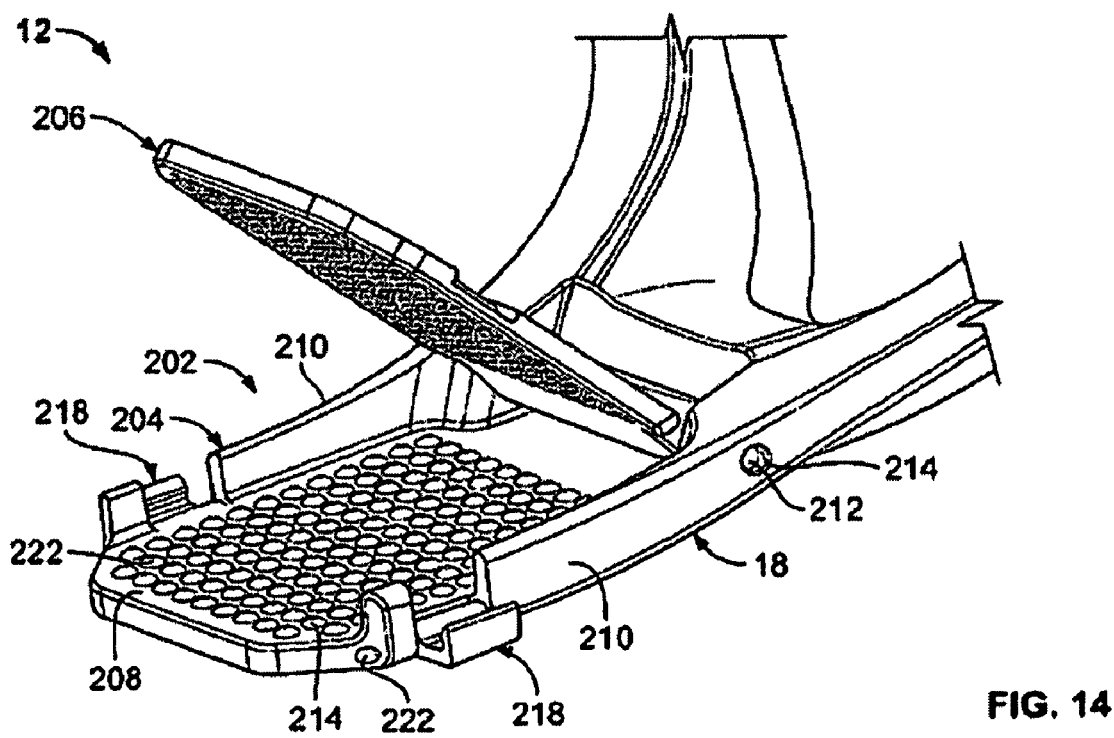
FIG. 14 is another perspective view of the first arm of the eyewear of FIG. 10, the strap retention mechanism shown in an open position.
Figure 15A:
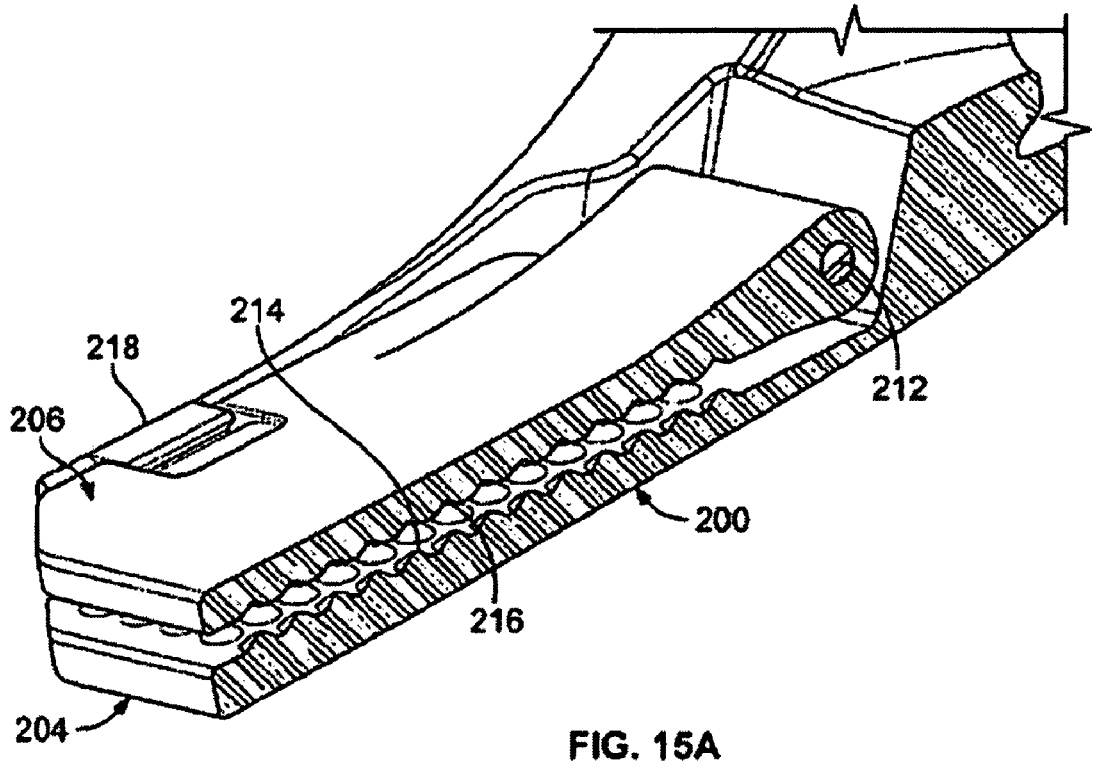
FIG. 15A is a cross-sectional view taken along the line 15A-15A of FIG. 13.
Figure 15B:
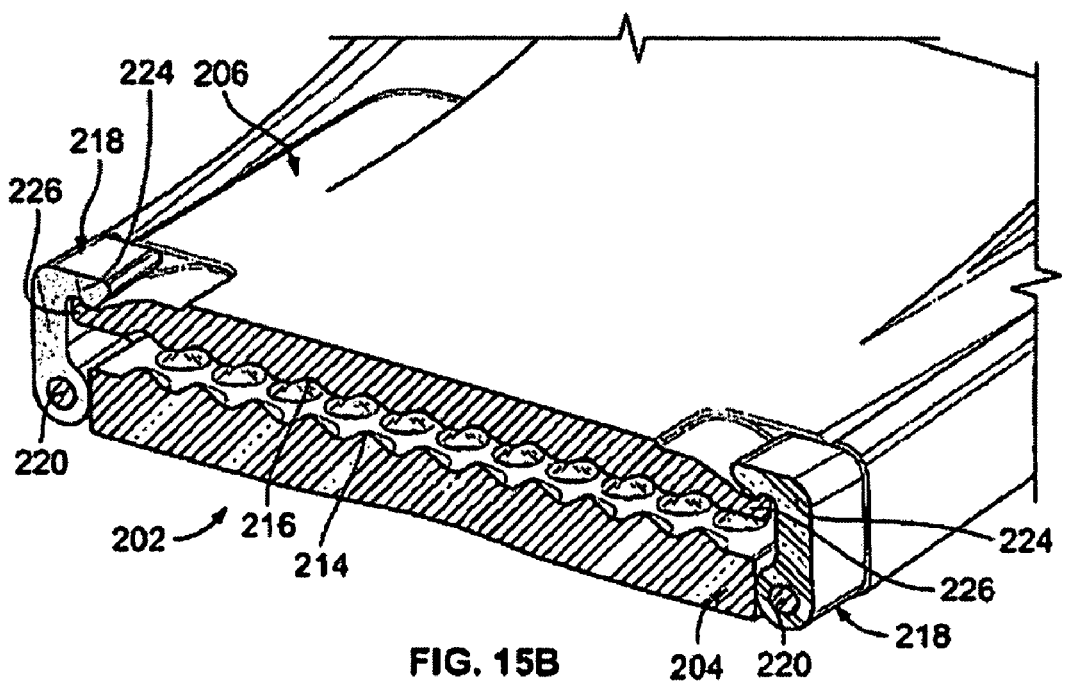
FIG. 15B is a cross-sectional view taken along the line 15B-15B of FIG. 13.

The strap retention mechanism 202 may additionally include one or more clasps 218 for retaining the second jaw 206 in the closed position. As shown in the drawings, the strap retention mechanism 202 may include first and second clasps 218. The clasps 218 will be understood to be substantially identical to one another. The clasps 218 are moveable between a locked position (as shown in FIGS. 13, 15A and 15B, for example) and an unlocked position (as shown in FIG. 14, for example). In the locked position, the clasps 218 lock the second jaw 206 relative to the first jaw 204 and thereby maintain the strap 16 within the strap retention mechanism.

Each clasp 218 may be coupled to the first arm 18 for relative movement about a clasp pivot axis. The axis may be perpendicular to the jaw axis and may be defined by a pin 220 disposed in openings 222 of the first arm 18 and extending through the respective clasp 218. In this manner, the clasps 218 may articulate between the open and closed positions. Each clasp 218 may define a flange 224 at a free end thereof that cooperates with a flange 226 defined at an upper surface of the second jaw 206. When the second jaw 206 captures the strap 16, it is biased toward an open direction through the resilient nature of the strap 16. This bias is opposed by the cooperating flanges 224 and 226 to prevent opening of the second jaw 206.

Figure 12A:
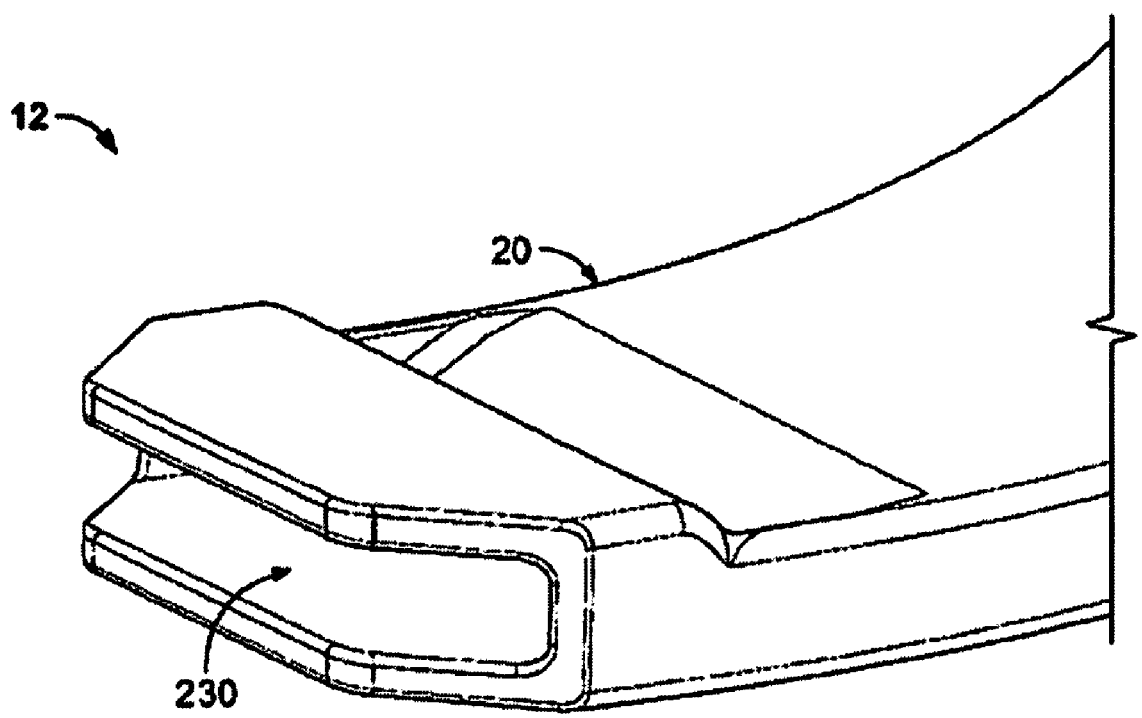
FIG. 12A is a perspective view of a second arm of a frame of the eyewear of FIG. 10.
Figure 12B:
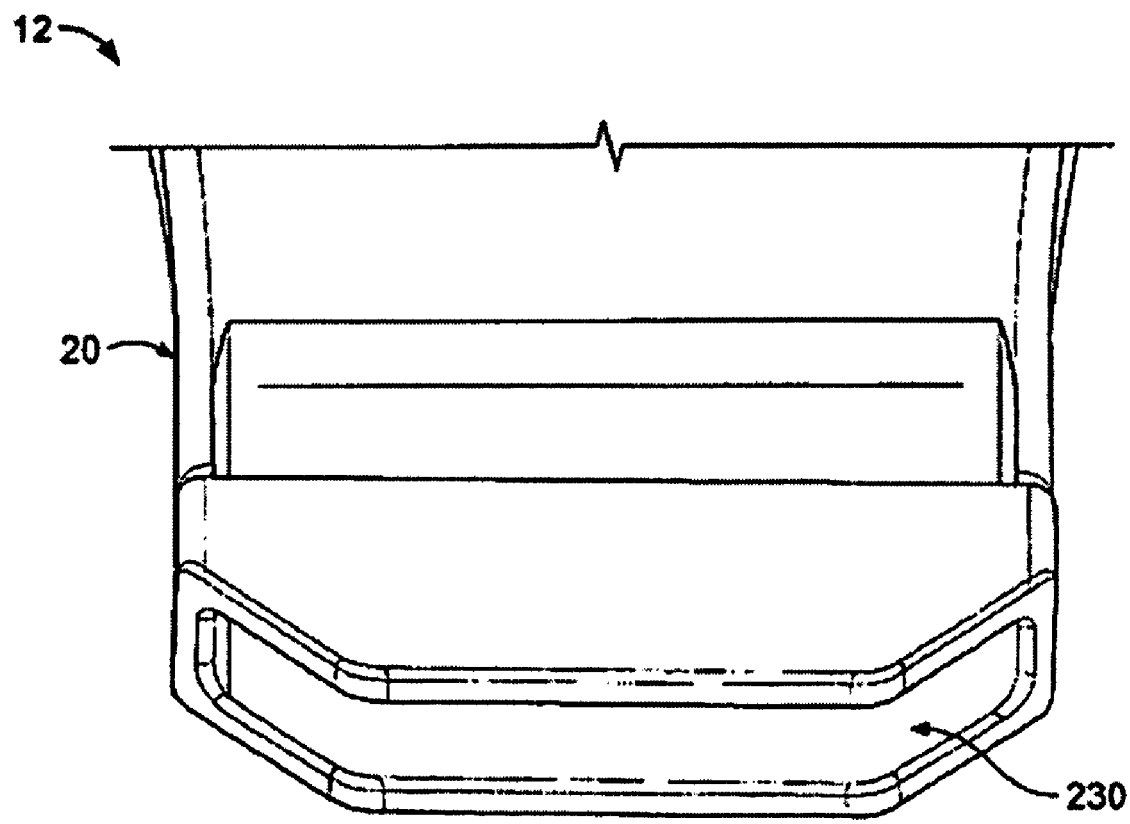
FIG. 12B is another perspective view of the second arm of FIG. 12A.

With particular reference to FIGS. 12A and 12B, the second arm 20 of the frame 12 defines an opening 230 for receiving the strap 16. With the first end 36 of the adjustable strap 16 retained by the strap retention mechanism 202, the second end 38 may be drawn through the opening 230. In the manner discussed above, the second end 38 may be secured to the remainder of the strap 16.

Figure 16:
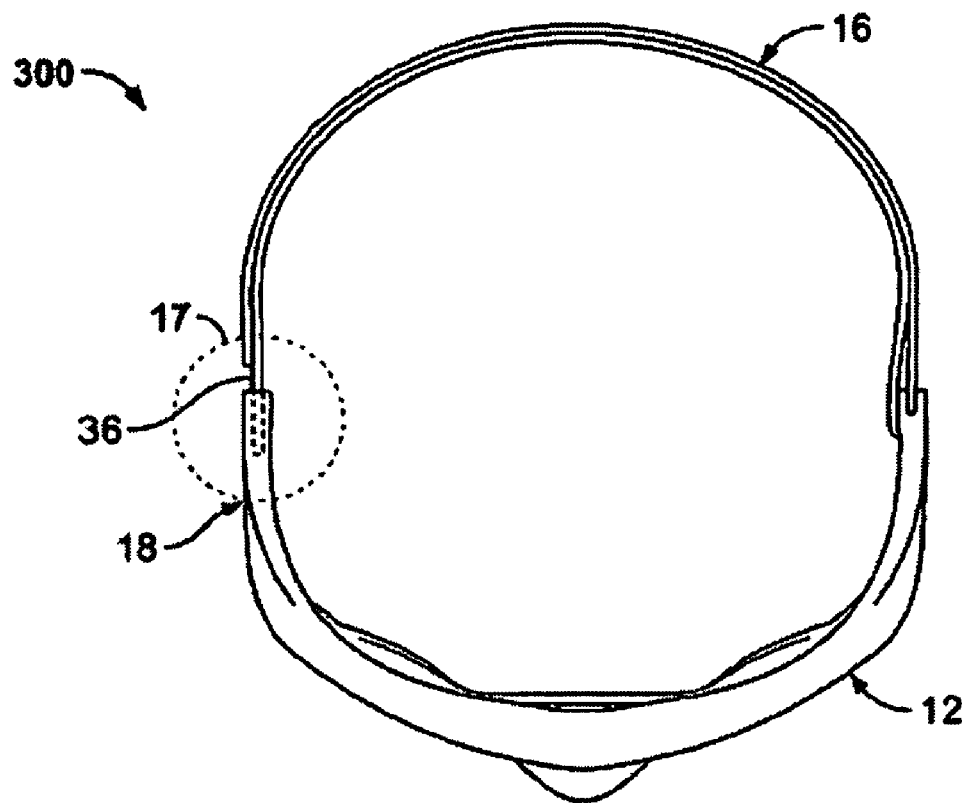
FIG. 16 is a perspective view of another form of eyewear incorporating an adjustable strap in accordance with the present teachings.
Figure 17:
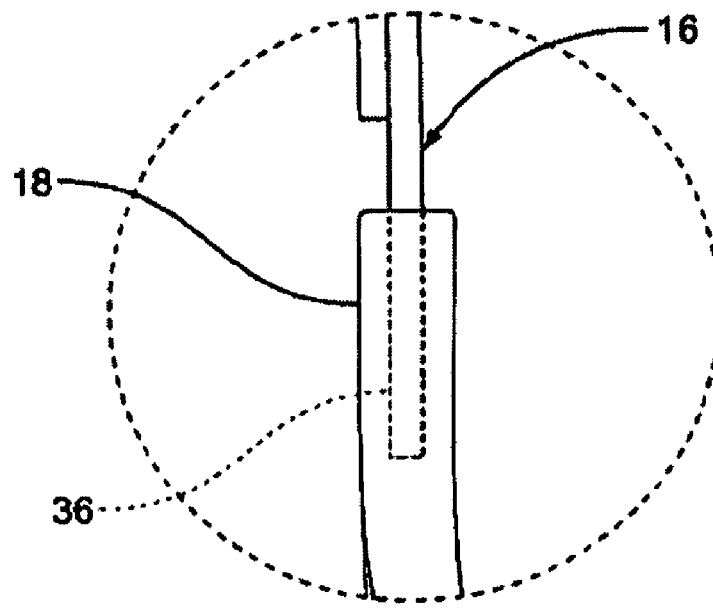
FIG. 17 is an enlarged view of the detail of Circle 17 of FIG. 16.

Turning to FIGS. 16 and 17, another form of eyewear in accordance with the present teachings is illustrated and generally identified at reference character 300. In view of the similarities between the eyewear 300 and the previously described eyewear, like reference characters are again used between the respective drawings to indicate similar elements. In accordance with one aspect, the eyewear 300 differs from the previously described embodiments in that a first end 36 of the strap 16 is permanently retained by the eyewear 300. In this regard, a first end or arm 18 of the eyewear 300 may be injection molded or otherwise formed to permanently capture the first end 36 of the strap.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. Eyewear comprising:
    a frame including a first side and a second side;
    an adjustable strap including a first end and a second end;
    the adjustable strap further including a first side and a second side, the second side having a first portion and a second portion, the first portion including one of a hook material and a loop material, the second portion including the other of the hook material and loop material, the strap passing through an opening proximate the second side of the frame and double over such that the hook material cooperatively engages the loop material;
    wherein at least one of the hook material and the loop material includes a plurality of distinct segments secured to an elastic band and spaced apart along the elastic band.

2. The eyewear of claim 1, wherein the opening proximate the second side of the frame is integrally formed with the frame.

3. The eyewear of claim 1, wherein the opening proximate the second side of the frame is defined by a loop member carried by the frame.

4. The eyewear of claim 1, wherein the first end of the adjustable strap is provided with indicia corresponding to a plurality of different head circumferences such that the adjustable strap may be cut along predetermined lines to provide a custom fit for a specific head circumference.

5. The eyewear of claim 1, wherein the first side of the strap includes a graphic.

6. The eyewear of claim 1, further comprising a clip releasably securing the adjustable strap to the first side of the frame wherein the clip is snap fit to the frame.

7. The eyewear of claim 6, wherein the clip includes first and second jaws coupled for relative movement about a pivot axis and further wherein the clip includes a base member carried by one of the first and second jaws, the base member being snap fit within an opening defined by the frame.

8. The eyewear of claim 7, wherein one of the first and second jaw includes a plurality of teeth engaging the strap.

9. The eyewear of claim 1, wherein the first side of the frame defines an opening and the clip is matingly received and recessed within the opening.

10. The eyewear of claim 9, further comprising a retention mechanism carried by the frame, the retention mechanism includes a first jaw and a second jaw, the second jaw pivotally coupled to the frame and the first side of the frame integrally defining the first jaw that cooperates with the second jaw to capture the strap therebetween.

11. The eyewear of claim 9, wherein the retention mechanism includes at least one clasp for securing the first jaw relative to the second jaw.

12. The eyewear of claim 9, wherein the second jaw pivots about a jaw pivot axis and each clasp pivots about a clasp pivot axis, each clasp pivot axis being generally parallel to the jaw pivot axis.

13. Eyewear comprising:

a frame including a first side and a second side;

a strap extending between the first and second sides of the frame and including a first end and a second end;

the strap further including a first side and a second side, the second side having a first portion and a second portion, the first portion including one of a hook material and a loop material, the second portion including the other of the hook material and loop material, the strap passing through an opening proximate the second side of the frame and double over for a portion of a length between the first and second sides such that the hook material cooperatively engages the loop material;

wherein at least one of the hook material and the loop material includes a plurality of distinct segments secured to an elastic band and spaced apart along the elastic band.

14. The eyewear of claim 13, wherein the other of the first and second jaws includes a plurality of recesses for receiving the plurality of teeth.

15. The eyewear of claim 14, wherein the at least one clasp includes first and second clasps.

* * * * *

UNITED STATES PATENT AND TRADEMARK OFFICE
CERTIFICATE OF CORRECTION

| | |
|---|---|
| PATENT NO. | : 7,699,463 B2 |
| APPLICATION NO. | : 12/356260 |
| DATED | : April 20, 2010 |
| INVENTOR(S) | : Jerry Fielding, Jr. |

It is certified that error appears in the above-identified patent and that said Letters Patent is hereby corrected as shown below:

Cover page, item (63) should be -- Continuation of application No. 12/110,810, filed on April 28, 2008, now Pat. No. 7,478,906, which is a CIP of PCT/US2006/042231, filed October 27, 2006, which claims benefit of USSN 60/731,523, filed October 28, 2005 --

Signed and Sealed this
Fifth Day of July, 2011

David J. Kappos
*Director of the United States Patent and Trademark Office*